(12) United States Patent
Choi et al.

(10) Patent No.: US 9,278,336 B2
(45) Date of Patent: Mar. 8, 2016

(54) SCR ON DIESEL PARTICULAR FILTER AND METHOD FOR PRODUCING THE SAME

(75) Inventors: Sung Mu Choi, Seongnam-si (KR); Hyo Kyung Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 811 days.

(21) Appl. No.: 13/487,879

(22) Filed: Jun. 4, 2012

(65) Prior Publication Data
US 2013/0136662 A1 May 30, 2013

(30) Foreign Application Priority Data

Nov. 28, 2011 (KR) .................. 10-2011-0125045

(51) Int. Cl.
| | |
|---|---|
| *B01D 50/00* | (2006.01) |
| *B01J 21/04* | (2006.01) |
| *B01J 23/38* | (2006.01) |
| *F01N 3/20* | (2006.01) |
| *F01N 3/022* | (2006.01) |
| *F01N 3/035* | (2006.01) |
| *B01J 37/02* | (2006.01) |
| *B01J 35/00* | (2006.01) |
| *B01J 23/42* | (2006.01) |
| *B01J 29/06* | (2006.01) |
| *B01J 35/04* | (2006.01) |
| *B01J 35/10* | (2006.01) |
| *B01J 37/00* | (2006.01) |
| *B01D 53/94* | (2006.01) |

(52) U.S. Cl.
CPC .............. *B01J 21/04* (2013.01); *B01D 53/9468* (2013.01); *B01J 23/38* (2013.01); *B01J 23/42* (2013.01); *B01J 29/06* (2013.01); *B01J 35/0006* (2013.01); *B01J 35/04* (2013.01); *B01J 35/1019* (2013.01); *B01J 37/0036* (2013.01); *B01J 37/0201* (2013.01); *B01J 37/0244* (2013.01); *B01J 37/0246* (2013.01); *F01N 3/0222* (2013.01); *F01N 3/035* (2013.01); *F01N 3/2066* (2013.01); *B01D 53/944* (2013.01); *B01D 53/9418* (2013.01); *B01D 2255/102* (2013.01); *B01D 2255/2092* (2013.01); *B01D 2255/50* (2013.01); *B01D 2255/9155* (2013.01); *B01D 2255/9202* (2013.01); *F01N 2510/063* (2013.01); *F01N 2510/0684* (2013.01); *Y02T 10/24* (2013.01); *Y10T 156/10* (2015.01)

(58) Field of Classification Search
CPC ............. B01J 37/02436; B01J 35/1019; B01J 37/0201; B01D 2255/102; B01D 2255/9202; F01N 2510/063
USPC .................................... 422/171, 177
See application file for complete search history.

(56) References Cited

U.S. PATENT DOCUMENTS

2009/0155135 A1* 6/2009 Li ................................. 422/180
2010/0058746 A1 3/2010 Pfeifer et al.
(Continued)

FOREIGN PATENT DOCUMENTS

| JP | 04-265155 | 9/1992 |
|---|---|---|
| JP | 3247956 B2 | 11/2001 |

(Continued)

*Primary Examiner* — Tom P Duong
(74) *Attorney, Agent, or Firm* — Morgan, Lewis & Bockius LLP

(57) ABSTRACT

An SDPF (SCR on Diesel Particular Filter) includes a porous filter collecting PM (Particulate Materials) of diesel exhaust gas, an SCR (Selective Catalytic Reduction) catalyst layer coated on an exhaust gas inlet of the filter, an aluminum oxide layer coated on an exhaust gas outlet of the filter, and a precious metal catalyst layer coated on the surface of the aluminum oxide layer, and a method for producing the same.

9 Claims, 2 Drawing Sheets

(56) References Cited

U.S. PATENT DOCUMENTS

2010/0247396 A1   9/2010   Zuberi
2011/0229391 A1*  9/2011   Paulus et al. ............... 423/213.2

FOREIGN PATENT DOCUMENTS

| KR | 10-2010-0101400 A | 9/2010 |
| KR | 10-2011-0110818 A | 10/2011 |

* cited by examiner

☒ : SCR Catalyst
☐ : Filter
● : SOOT

☒ : SCR Catalyst
☐ : Filter
● : SOOT
☒ : Al2O3 Layer
⊞ : Al2O3 Precious Metal
      Catalyst Layer

US 9,278,336 B2

SCR ON DIESEL PARTICULAR FILTER AND METHOD FOR PRODUCING THE SAME

CROSS-REFERENCE TO RELATED APPLICATION

The present application claims priority of Korean Patent Application Number 10-2011-0125045 filed Nov. 28, 2011, the entire contents of which application is incorporated herein for all purposes by this reference.

BACKGROUND OF INVENTION

1. Field of Invention

The present disclosure relates to an SDPF (SCR on Diesel Particular Filter), which can prevent the $NH_3$ oxidation reaction by a precious metal catalyst because an SCR catalyst layer and a precious metal catalyst layer are separated, and a method for producing the same.

2. Description of Related Art

In SDPF (SCR on Diesel Particular Filter), an SCR (Selective Catalytic Reduction) catalyst (Generally, Cu-zeolite, Fe-zeolite) is coated on a porous DPF (Diesel Particular Filter), and NOx in $NH_3$ and exhaust gas supplied from the whole SDPF is reacted on the SCR catalyst and is purified to water and $N_2$.

Further, because the SDPF functions as a filter, it collects soot (PM, Particulate Materials) in exhaust gas like DPF, and increase the exhaust gas temperature through post injection of a diesel engine resulting to oxidizing/removing the soot collected on the SDPF.

Now, the SDPF is classified to passive type and active type. The passive type is LNT+SDPF type, and when NOx collected in LNT is subjected to DeNOx process by post injection, $NH_3$ is produced as a byproduct, and the $NH_3$ and excess NOx in the exhaust gas are purified to $NO_2$ in the SDPF.

The active type is equipped with an urea (urea water) injector on the whole SDPF and provides urea, and $NH_3$ vaporized from the UREA is reacted with NOx in the SDPF and purified to $N_2$. And, both passive and active types collect soot as SDPF's own function, increase the exhaust gas temperature by periodical post injection of an engine, and oxidize/burn the soot collected in the filter.

When increasing the exhaust gas temperature or producing $NH_3$ by the $2^{nd}$ jet, the $2^{nd}$ EM (HC, CO and the like) is optionally generated. In the existing system (DOC+DPF or LNT+DPF), the $2^{nd}$ EM, optionally generated by a catalyst (Pt, Pd and the like) coated on the DPF, was removed However, in the passive/active SDPF, the $2^{nd}$ EM should be removed by an SCR catalyst coated on the DPF, but the SCR catalyst coated on the DPF is Zeolite type generally and has very low oxidation performance of the $2^{nd}$ EM (CO, HC and the like) as compared with a precious metal catalyst.

FIG. 1 is a drawing representing the distribution of a conventional SDPF according to time. A filter material applied to a general SDPF includes SiC, AT, Cordierite and the like, and the porosity is between 55 and 65%. Further, the mean diameter of the pore is about 10~25 μm. When it is applied to the SDPF, the distributions of the soot and the SCR catalyst are as shown in FIG. 1. The SCR catalyst is coated through a DPF inlet face to an outlet face because many SCR catalysts are coated on the porous DPF. This way, NOx is purified through the SCR reaction of $NH_3$ and NOx on the SCR catalyst. However, the SCR catalyst can't sufficiently purify the $2^{nd}$ EM generated when $NH_3$ is produced by the post injection and the DPF is regenerated.

Therefore, when applying the SDPF, a technique reducing the $2^{nd}$ EM optionally produced by the post injection is needed. When the SCR catalyst (Zeolite type) is coated on the wall side of the exhaust gas inlet of the porous DPF, and the precious metal catalyst is coated on the wall side of the exhaust gas outlet, the precious metal catalyst coated on the outlet face is coated to the wall side of the exhaust gas inlet, $NH_3$ supplied to the wall side of the exhaust gas inlet is oxidized, and $NH_3+NOx=N_2+H_2O$ reaction is disturbed. Thus, when the precious metal catalyst is coated on the wall side of the exhaust gas outlet using a general coating method, there is a problem that it disturbs the SCR reaction of $NH_3+$NOx and the NOx purification rate becomes low.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an SDPF, which can prevent the $NH_3$ oxidation reaction by a precious metal catalyst because an SCR catalyst layer and a precious metal catalyst layer are separated, and a method for producing the same.

Various aspects of the present invention provide for SDPF (SCR on Diesel Particular Filter) including a porous filter collecting PM (Particulate Materials) of diesel exhaust gas, an SCR (Selective Catalytic Reduction) catalyst layer coated on an exhaust gas inlet of the filter, an aluminum oxide layer coated on an exhaust gas outlet of the filter, and a precious metal catalyst layer coated on the surface of the aluminum oxide layer.

The SCR coating layer may be a coating layer comprising a zeolite catalyst.

The aluminum oxide layer may have the particle size of 80~120% of the filter pore size.

The precious metal catalyst layer may have the particle size of 80~120% of the filter pore size.

The precious metal catalyst layer may be formed by impregnating the precious metal with aluminum oxide.

The filter may be composed of plural filter panels arranged in layers, and opposite faces of the plural filter panels may form the exhaust gas inlet and outlet so as to form the inlet and outlet alternately.

Various aspects of the present invention provide for a method for producing the SDPF including a filter producing step of separating plural porous filter panel collecting PM (Particulate Materials) of diesel exhaust gas at certain interval and arranging in layers, an arranging step of forming an exhaust gas inlet and outlet with opposite faces of the filter panel wherein the inlet and outlet are formed alternately, an SCR layer coating step of impregnating the faces of the filter panel inlet with an SCR catalyst solution, an aluminum oxide layer coating step of impregnating the faces of the filter panel outlet with an aluminum oxide solution, and a precious metal catalyst layer coating step of impregnating the faces of the filter panel outlet with a precious metal catalyst solution.

In the aluminum oxide layer coating step, the aluminum oxide solution is prepared by milling and drying aluminum oxide and controlling the viscosity thereof, and the faces of the filter panel outlet are impregnated with the solution followed by drying and coating thereof.

In the precious metal catalyst layer coating step, the precious metal catalyst solution is prepared by milling aluminum oxide, mixing with a precious metal precursor, calcinating and milling followed by controlling the viscosity thereof, and the faces of the filter panel outlet are impregnated with the solution followed by drying and coating thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
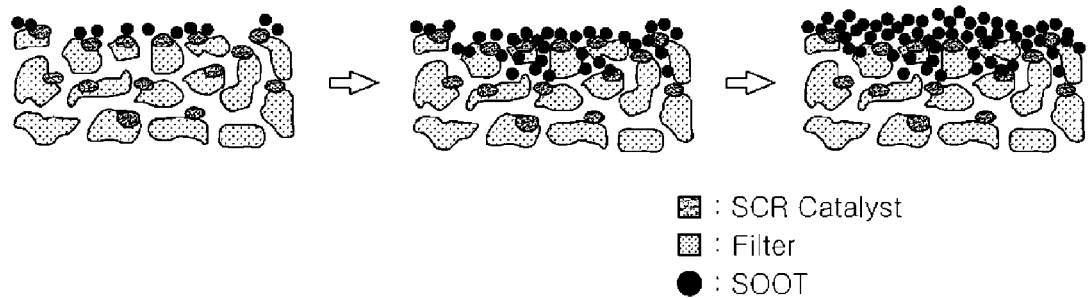
FIG. 1 is a drawing representing the distribution of a conventional SDPF according to time.

It should be understood that the appended drawings are not necessarily to scale, presenting a somewhat simplified representation of various features illustrative of the basic principles of the invention.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
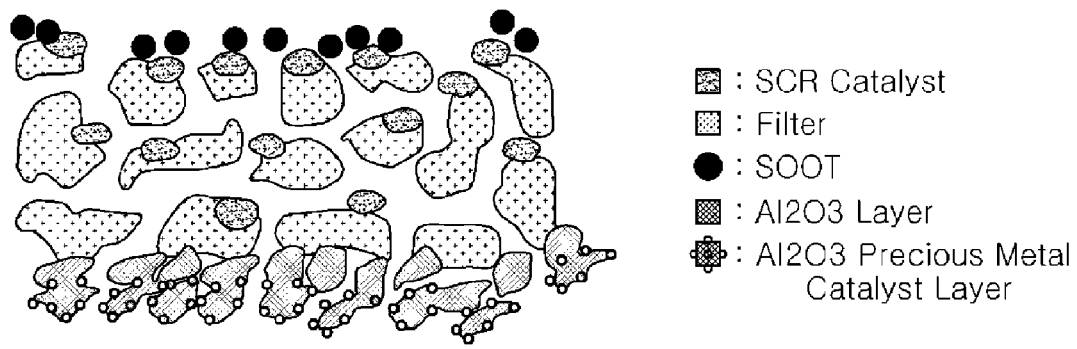
FIG. 2 is a constitutional diagram of a detail cross section of an exemplary SDPF according to the present invention.
Figure 3:
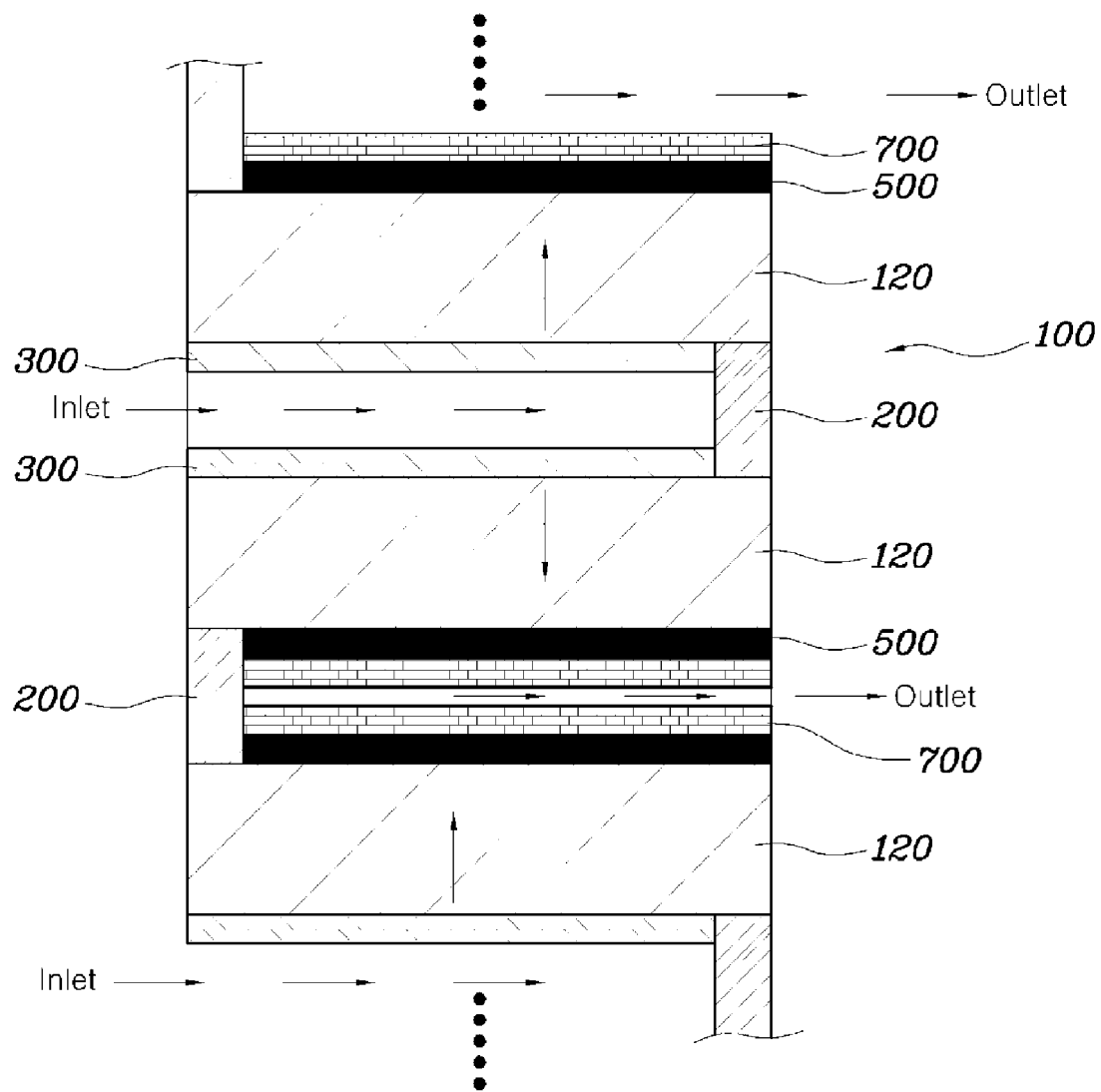
FIG. 3 is a constitutional diagram of an exemplary SDPF according to the present invention.

FIG. 2 is a constitutional diagram of a detail cross section of the SDPF according to one embodiment of the present invention, and FIG. 3 is a constitutional diagram of the entire SDPF according to one embodiment of the present invention.

The SDPF (SCR on Diesel Particular Filter) of the present invention includes a porous filter 100 collecting PM (Particulate Materials) of diesel exhaust gas, an SCR (Selective Catalytic Reduction) catalyst layer 300 coated on an exhaust gas inlet of the filter 100, an aluminum oxide layer 500 coated on an exhaust gas outlet of the filter 100, and a precious metal catalyst layer 700 coated on the surface of the aluminum oxide layer 500.

The SDPF of the present invention is prepared by sequentially coating an SCR catalyst (zeolite type) on one face of the porous SDPF filter, coating a boundary layer catalyst on the other face thereof and then by coating a precious metal catalyst. Namely, it is a method that the aluminum oxide ($Al_2O_3$) particles having the size equivalent to 80%~120% of the filter mean diameter are coated, and then a catalyst of $Al_2O_3$+ precious metal mixture having the size equivalent to 80%~120% of the filter mean diameter is coated thereon. This structure is well described in FIG. 2.

Namely, the sequent coating order is coating the SCR catalyst on the DPF inlet face of the porous filter, coating the $Al_2O_3$ particles having the size equivalent to the filter mean diameter 80%~120% on the DPF outlet face in advance, and further coating a catalyst, wherein the precious metal is deposited on the $Al_2O_3$ having the size equivalent to the filter mean diameter 80%~120%, on the DPF outlet face. This way, the $NH_3$ oxidation reaction by the precious metal catalyst can be prevented due the SCR catalyst layer and the precious metal catalyst layer are separated each other.

Therefore, the SDPF of the present invention is based on the porous filter 100 collecting PM (Particulate Materials) of diesel exhaust gas, and the SCR (Selective Catalytic Reduction) catalyst layer 300 is coated on the exhaust gas inlet of the filter 100. And then, the aluminum oxide layer 500 and the precious metal catalyst layer 700 are sequentially coated on the opposite side, the exhaust gas outlet of the filter 100. The aluminum oxide layer prevents the invasion of the precious metal catalyst layer, so as to faithfully carry out each role on the state that the SCR catalyst layer and the precious metal catalyst layer are separated.

On the other hand, the SCR coating layer 300 is a coating layer comprising a zeolite catalyst, the aluminum oxide layer 500 has the particle size of 80~120% of the filter pore size, and the precious metal catalyst layer 700 also has the particle size of 80~120% of the filter pore size.

The aluminum oxide, $Al_2O_3$, is an γ-form $Al_2O_3$, and acts as a barrier because it can suppress the interaction between the filter and $Pt/Al_2O_3$ coating layer by forming an $Al_2O_3$ coating layer between the filter and the $Pt/Al_2O_3$ coating layer. And, in order to act as the barrier, the $Al_2O_3$ must have the thermal stability, and the particle sintering should not be occurred. The γ-form $Al_2O_3$ has the thermal stability up to the temperature of 850° C.

Further, the γ-form $Al_2O_3$ has high surface area as having the specific surface are of about 150 $m^3/g$, and it surface is very rough and its shape is non-uniform. Thus, a material having a smooth surface and uniform surface shape can easily block pores of the filter physically, the rough and non-uniform γ-from $Al_2O_3$ provides a passage wherein the exhaust gas flows and reduces the back pressure (if an uniform material having low surface area and low thermal stability is used, its particles are sintered when being exposed to high temperature and its surface becomes smooth, and this increase the back pressure by blocking the pores of the filter). Further, because the $Al_2O_3$ has good coating property, it is coated on the filter particles and displays high adhesion performance. Therefore, it has high mechanical durability.

And, the precious metal catalyst layer 700 is prepared by impregnating the precious metal with the aluminum oxide. Further, the filter 100 is composed of plural filter panels 120 arranged in layers, and opposite faces of the plural filter panels 120 can form the exhaust gas inlet and outlet so as to form the inlet and outlet alternately.

This method for producing the SDPF includes a filter producing step of separating plural porous filter panel collecting PM (Particulate Materials) of diesel exhaust gas at certain interval and arranging in layers, an arranging step of forming an exhaust gas inlet and outlet with opposite faces of the filter panel wherein the inlet and outlet are formed alternately, an SCR layer coating step of impregnating the faces of the filter panel inlet with an SCR catalyst solution, an aluminum oxide layer coating step of impregnating the faces of the filter panel outlet with an aluminum oxide solution, and a precious metal catalyst layer coating step of impregnating the faces of the filter panel outlet with a precious metal catalyst solution.

Further, in the aluminum oxide layer coating step, the aluminum oxide solution can be prepared by milling and drying aluminum oxide and controlling the viscosity thereof, and the faces of the filter panel outlet can be impregnated with the solution followed by drying and coating thereof.

And, in the precious metal catalyst layer coating step, the precious metal catalyst solution can prepared by milling aluminum oxide, mixing with a precious metal precursor, calcinating and milling followed by controlling the viscosity thereof, and the faces of the filter panel outlet can be impregnated with the solution followed by drying and coating thereof.

First of all, the plural porous filter panels are separated at certain interval and arranged in layers to prepare the filter, and plugs 220 are arranged zigzag between each filter panels. The inlet is opened to one side and the outlet is opened to the other side by the plug 200.

And, the faced down inlet is impregnated with the SCR catalyst solution so as to coat the SCR catalyst layer only on the faces of the filter panel opposite to the inlet.

And, the faced down outlet is impregnated with the aluminum oxide solution to coat the aluminum coating layer and dried, and then the faced down outlet is impregnated with the precious metal catalyst solution so as to coat the precious metal catalyst layer. Through this process, the SDPF of the present invention illustrated in FIGS. 2 and 3 is prepared.

According to the SDPF and the method for producing the same consisting of the structure described above, a boundary layer is formed on the SCR catalyst (DPF inlet face) and the precious metal catalyst (DPF outlet face), and therefore, it can prevent that $NH_3$ supplied to the DPF is oxidized instead of contributing to the NOx purification rate.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An SCR on Diesel Particular Filter (SDPF) comprising:
an exhaust gas inlet and an exhaust gas outlet;
a porous filter collecting Particulate Materials (PM) of diesel exhaust gas, the porous filter having a filter pore size;
a Selective Catalytic Reduction (SCR) catalyst layer coated on the exhaust gas inlet of the porous filter;
an aluminum oxide layer coated on the exhaust gas outlet of the filter; and
a precious metal catalyst layer coated on a surface of the aluminum oxide layer,
wherein the SCR catalyst layer and the precious metal catalyst layer are separated each other by the aluminum oxide layer therebetween.

2. The SDPF of claim 1, wherein the SCR layer is a coating layer comprising a zeolite catalyst.

3. The SDPF of claim 1, wherein the aluminum oxide layer has a particle size of 80~120% of the filter pore size.

4. The SDPF of claim 1, wherein the precious metal catalyst layer has a particle size of 80~120% of the filter pore size.

5. The SDPF of claim 1, wherein the precious metal catalyst layer is formed by impregnating a precious metal with aluminum oxide.

6. The SDPF of claim 1, wherein the filter includes a plurality of filter panels arranged in layers, and opposite faces of the plurality of filter panels form the exhaust gas inlet and outlet so as to form an inlet and outlet alternately.

7. A method for producing an SCR on Diesel Particular Filter (SDPF) comprising: a filter producing step of separating plural porous filter panel collecting Particulate Materials (PM) of diesel exhaust gas at certain interval and arranging in layers; an arranging step of forming an exhaust gas inlet and outlet with opposite faces of the filter panel wherein the inlet and outlet are formed alternately; a Selective Catalytic Reduction (SCR) catalyst layer coating step of impregnating the faces of the filter panel inlet with an SCR catalyst solution; an aluminum oxide layer coating step of impregnating the opposite faces of the filter panel outlet with an aluminum oxide solution; and a precious metal catalyst layer coating step of impregnating the opposite faces of the filter panel outlet with a precious metal catalyst solution, wherein the SCR catalyst layer and the precious metal catalyst layer are separated each other by the aluminum oxide layer therebetween.

8. The method for producing an SDPF of claim 7, wherein in the aluminum oxide layer coating step, the aluminum oxide solution is prepared by milling and drying aluminum oxide and controlling the viscosity thereof, and the faces of the filter panel outlet are impregnated with the solution followed by drying and coating thereof.

9. The method for producing an SDPF of claim 7, wherein in the precious metal catalyst layer coating step, the precious metal catalyst solution is prepared by milling aluminum oxide, mixing with a precious metal precursor, calcinating and milling followed by controlling the viscosity thereof, and the faces of the filter panel outlet are impregnated with the solution followed by drying and coating thereof.

* * * * *